United States Patent
Deng et al.

(10) Patent No.: US 9,139,153 B2
(45) Date of Patent: Sep. 22, 2015

(54) VEHICLE SIDE IMPACT AIRBAG WITH LATERALLY EXTENDING THORACIC CHAMBER

(71) Applicant: FORD GLOBAL TECHNOLOGIES, LLC, Dearborn, MI (US)

(72) Inventors: Zhibing Deng, Northville, MI (US); Michael Dong, Novi, MI (US); Harish Honnavalli Dutt, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/018,700

(22) Filed: Sep. 5, 2013

(65) Prior Publication Data

US 2015/0061267 A1 Mar. 5, 2015

(51) Int. Cl.
*B60R 21/21* (2011.01)
*B60R 21/231* (2011.01)
*B60R 21/26* (2011.01)
B60R 21/233 (2006.01)

(52) U.S. Cl.
CPC ............ *B60R 21/23138* (2013.01); *B60R 21/21* (2013.01); *B60R 21/26* (2013.01); *B60R 21/233* (2013.01); *B60R 2021/23107* (2013.01); *B60R 2021/23308* (2013.01); *B60R 2021/23324* (2013.01)

(58) Field of Classification Search
CPC ............ B60R 21/23138; B60R 21/233; B60R 2021/23107; B60R 2021/23308
See application file for complete search history.

(56) References Cited

U.S. PATENT DOCUMENTS

| | | | |
|---|---|---|---|
| 3,610,657 A | 10/1971 | Cole | |
| 4,290,627 A | 9/1981 | Cumming et al. | |
| 4,360,223 A | 11/1982 | Kirchoff | |
| 5,022,675 A | 6/1991 | Zelenak, Jr. et al. | |
| 5,513,877 A | 5/1996 | MacBrien et al. | |
| 5,556,128 A * | 9/1996 | Sinnhuber et al. | 280/730.2 |
| 5,564,734 A | 10/1996 | Stuckle | |
| 5,575,497 A * | 11/1996 | Suyama et al. | 280/730.1 |
| 5,803,485 A * | 9/1998 | Acker et al. | 280/728.2 |
| 5,924,721 A * | 7/1999 | Nakamura et al. | 280/730.2 |

(Continued)

FOREIGN PATENT DOCUMENTS

| | | | | |
|---|---|---|---|---|
| DE | 19541513 A1 * | 5/1996 | | B60R 21/00 |
| DE | 102006021662 | 11/2007 | | |

(Continued)

OTHER PUBLICATIONS

Moditech Rescue Solutions BV, http://www.moditech.com/rescue/index3.php?action=safety_system&page=airbag (Sep. 9, 2013).

*Primary Examiner* — Nicole Verley
(74) *Attorney, Agent, or Firm* — Frank A. MacKenzie; Price Heneveld LLP (57) ABSTRACT

A vehicle side impact airbag has an inflator, a main inflatable chamber disposed for contact with the side arm of the vehicle occupant when inflated, and a separate laterally extending thoracic chamber in metered fluid communication with the main inflatable chamber of the side airbag extending laterally into the passenger compartment. The laterally extending thoracic chamber of the airbag is disposed for contact with the lower thoracic region of the vehicle occupant below the occupant side arm when inflated, whereby the side airbag simultaneously engages the occupant lower thoracic region and side arm when inflated.

20 Claims, 5 Drawing Sheets

(56) References Cited

U.S. PATENT DOCUMENTS

| | | | |
|---|---|---|---|
| 6,042,141 A * | 3/2000 | Welch et al. | 280/729 |
| 6,279,944 B1 | 8/2001 | Wipasuramonton et al. | |
| 6,851,706 B2 * | 2/2005 | Roberts et al. | 280/730.1 |
| 7,556,288 B2 | 7/2009 | Zauritz et al. | |
| 7,758,069 B2 | 7/2010 | Enders | |
| 7,946,621 B2 * | 5/2011 | Honda et al. | 280/743.2 |
| 2005/0029781 A1 * | 2/2005 | Enders et al. | 280/732 |
| 2006/0145459 A1 | 7/2006 | Sendelbach et al. | |
| 2007/0164546 A1 * | 7/2007 | Kai et al. | 280/730.2 |
| 2008/0231026 A1 * | 9/2008 | Naito et al. | 280/730.2 |
| 2009/0218798 A1 * | 9/2009 | Garner | 280/742 |
| 2010/0133795 A1 | 6/2010 | Fukuda et al. | |
| 2010/0171292 A1 * | 7/2010 | Schmidt et al. | 280/730.2 |
| 2011/0012328 A1 | 1/2011 | Ewing et al. | |
| 2011/0079991 A1 * | 4/2011 | Ravenberg et al. | 280/740 |
| 2012/0139216 A1 | 6/2012 | Scott et al. | |

FOREIGN PATENT DOCUMENTS

| | | | | |
|---|---|---|---|---|
| DE | 102009021635 A1 * | 11/2010 | | B60R 21/207 |
| WO | WO 2004065179 A1 * | 8/2004 | | B60R 21/22 |
| WO | WO 2008113684 A1 * | 9/2008 | | B60R 21/16 |
| WO | WO 2011006560 A1 * | 1/2011 | | B60R 21/131 |
| WO | WO 2011016107 A1 * | 2/2011 | | B60R 21/20 |
| WO | WO 2011077510 A1 * | 6/2011 | | B60R 21/231 |

* cited by examiner

VEHICLE SIDE IMPACT AIRBAG WITH LATERALLY EXTENDING THORACIC CHAMBER

FIELD OF THE INVENTION

The present invention generally relates to a side impact airbag for a motor vehicle to optimize side impact protection during a vehicle side impact event, specifically a side impact airbag that includes a laterally extending thoracic chamber that provides simultaneous side impact airbag engagement with the occupant upper arm and thorax during the impact event.

BACKGROUND OF THE INVENTION

Side impact airbag systems for use in motor vehicles have been adopted to mitigate occupant injuries during motor vehicle side impact events, and are generally well-known in the art. Traditionally, such side impact airbag systems have been used in combination with exterior motor vehicle components to manage and control motor vehicle impact events with external objects during side impact events. Further, side impact airbag systems are used to address vehicle intrusion during a side impact event and provide occupant restraint against occupant collision with interior motor vehicle components, such as the so-called A-pillar, B-pillar, door trim, and interior upper rail assembly. Side airbag systems are designed to deploy substantially immediately (i.e., 5 to 10 milliseconds) upon detection of the high speed impact event and stay inflated for about 30 to 70 milliseconds.

In the United States, Federal Motor Vehicle Safety Standard (FMVSS) No. 214 was promulgated to address side impact events. In sum, FMVSS 214 presently requires that a simulated vehicle occupant experience upper and lower thoracic loads and head de-accelerations within specified limits. However, the complexity of side impact mitigation has increased significantly with the introduction of new requirements for FMVSS 214 and the new Lateral Impact New Car Assessment Program (LINCAP). Also, motor vehicles are tested according to side impact procedures and criteria established by the Insurance Institute for Highway Safety (IIHS). Additionally, various side impact procedures and criteria are emerging worldwide, for example, with the introduction of the European New Car Assessment Program (EuroNCAP) and Chinese New Car Assessment Program (C-NCAP). While all of these evaluative techniques share the same goal of improving side impact crashworthiness, not all share the same procedures and criteria.

Yet motor vehicle design and engineering efforts in the face of a global market encourages the use of common solutions. One solution to side impacts is the use of a side impact airbag. Yet a common side impact airbag solution for a global market requires that the side airbag perform within the established criteria of every market, and obtain crashworthiness results that fall within the criteria of the United States (UNCAP), Europe (EuroNCAP) and China (C-NCAP), as well as IIHS testing. It is possible to use a different side impact airbag for each market, for example, one side impact airbag for use in the United States market and a different side impact airbag for the rest of the global market. However, this does not provide a common solution worldwide.

Further, side impact mitigation requires accommodation of a wide range of occupant sizes and masses. For example, it may be desirable to design the side impact airbag to be relatively "soft" in order to accommodate a more vulnerable prototypical occupant, such as the so-called 5th percentile occupant. However, such a side impact airbag may be too "soft" for other prototypical occupant profiles, such as for the 50th percentile occupant.

Finally, it has also been observed that a typical side impact airbag, when deployed, may not engage the entire occupant's body side because the occupant's upper arm prevents the side airbag from engaging the entire thoracic region of the body at early stages of impact. Hence, solutions for providing side impact occupant protection with a common global design would be advantageous.

The vehicle side airbag disclosed herein particularly accomplishes the foregoing optimization of vehicle performance and provides a cost-efficient solution with the potential to enable use of a common side airbag design for the global market. The disclosed side airbag has an inflator, a main inflatable chamber disposed for contact with the side arm of the vehicle occupant when inflated, and a separate laterally extending thoracic chamber in metered fluid communication with the main inflatable chamber of the side airbag extending laterally into the passenger compartment and disposed for contact with the lower thoracic region of the vehicle occupant below the occupant's side arm when inflated. Thus, the side airbag engages both the occupant's side arm and lower thoracic region when inflated. The laterally extending thoracic chamber, situated below the occupant's arm, allows essentially simultaneous side airbag engagement with the occupant's upper arm, particularly the shoulder, and the lower thorax. The laterally extending thoracic chamber thus achieves maximal occupant body side coverage during the entire impact event. By maximizing the area upon which the side airbag imparts its load on the occupant, the side airbag is able to absorb more impact energy. The laterally extending thoracic chamber may thereby be designed to simultaneously optimize compliance with FMVSS 214 and other side impact crashworthiness testing protocols by metering fluid communication with the main inflation chamber of the side airbag.

Moreover, the side airbag can be configured so that the inflator inflates the main inflatable chamber at a first predetermined rate of pressure increase and an internal vent between the main inflatable chamber and the laterally extending thoracic chamber inflates the laterally extending thoracic chamber at a second predetermined rate of pressure increase. Thus, the laterally extending thoracic chamber can be made "soft" to accommodate the more vulnerable load case and still stiff enough to absorb enough energy from more severe load cases. In addition, the stiffness of the laterally extending thoracic chamber can be readily engineered to be different from the main chamber, thereby providing opportunities to optimize the performance of the side airbag system from one market to another.

SUMMARY OF THE INVENTION

According to one aspect of the present disclosure, a side airbag is provided to restrain a vehicle occupant situated within a passenger compartment of a motor vehicle during a vehicle side impact event. The vehicle occupant has an upper and lower thoracic region and a side arm. The side airbag has an inflator, a main inflatable chamber disposed for contact with the side arm of the vehicle occupant when inflated, and a separate laterally extending thoracic chamber in fluid communication with the main inflatable chamber of the side airbag extending laterally into the passenger compartment and disposed for contact with the lower thoracic region of the vehicle occupant below the occupant's side arm when inflated. The side airbag simultaneously engages the occupant's lower thoracic region and side arm when inflated.

Still another aspect of the present disclosure is a side airbag where the main inflatable chamber has an inner and outer panel and the laterally extending thoracic chamber comprises a third panel sealingly attached to the inner panel of the main inflation chamber.

Yet another aspect of the present disclosure is a side airbag where fluid communication between the main inflatable chamber and the laterally extending thoracic chamber is obtained through an internal vent in the inner panel of the main inflatable chamber.

An additional aspect of the present disclosure is a side airbag where the inflator inflates the main inflatable chamber at a first predetermined rate of pressure increase and an internal vent in the inner panel of the main inflatable chamber inflates the laterally extending thoracic chamber at a second predetermined rate of pressure increase.

Another aspect of the present disclosure is a side airbag where the first predetermined rate of pressure increase in the main inflatable chamber exceeds the second predetermined rate of pressure increase in the laterally extending thoracic chamber.

An additional aspect of the present disclosure is a side airbag where the laterally extending thoracic chamber has a forward edge and a rearward edge, with the forward edge disposed lower than the rearward edge.

A further aspect of the present disclosure is a side airbag where the main inflatable chamber has an outer periphery and the laterally extending thoracic chamber has an outer periphery having a first portion thereof coinciding with and attached to a lower portion of the outer periphery of the main inflatable chamber and the laterally extending thoracic chamber outer periphery has a second portion attached to the inner panel of the main inflation chamber.

Yet a further aspect of the present disclosure is a side airbag where the second portion of the outer periphery of the laterally extending thoracic chamber forms an inclined seam between the main inflation chamber and the laterally extending thoracic chamber along the inner panel of the main inflation chamber.

An additional aspect of the present disclosure is a side airbag where the laterally extending thoracic chamber comprises a third panel disposed substantially over and attached about a periphery of a lower portion of the inner panel of the main inflatable chamber and the lower portion of the inner panel of the main inflatable chamber includes an internal vent in the inner panel of the main inflatable chamber to provide controlled fluid communication between the laterally extending thoracic chamber and the main inflatable chamber of the side airbag.

Yet another aspect of the present disclosure is a side airbag where a third panel of the laterally extending thoracic chamber has an external vent to control the rate of pressure increase and decrease therein during the side impact event.

A still further aspect of the present disclosure is a side airbag where the inflator inflates the main inflatable chamber at a first predetermined rate of pressure increase and the internal vent in the inner panel of the main inflatable chamber and the external vent in the third panel of the laterally extending thoracic chamber cooperate to inflate the laterally extending thoracic chamber at a second predetermined rate of pressure increase.

Another aspect of the present disclosure is a side airbag having an inflator, a main inflatable chamber disposed for contact with a side arm of a vehicle occupant when inflated, and a laterally extending thoracic chamber in fluid communication with the main inflatable chamber extending laterally into a vehicle passenger compartment and disposed for contact with a thoracic region of the occupant when inflated, whereby the side airbag simultaneously engages the thoracic region and side arm when inflated.

A yet additional aspect of the present disclosure is a side airbag where the thoracic region of the vehicle occupant comprises an upper thoracic region and a lower thoracic region and the laterally extending thoracic chamber engages the lower thoracic region below the occupant's side arm when inflated.

A further aspect of the present disclosure is a side airbag where the main inflatable chamber comprises an inner and outer panel and the laterally extending thoracic chamber comprises a third panel attached to the inner panel of the main inflation chamber and fluid communication between the main inflatable chamber and the laterally extending thoracic chamber is obtained through an internal vent in the inner panel of the main inflatable chamber, whereby the inflator inflates the main inflatable chamber at a first predetermined rate of pressure increase, and the internal vent in the inner panel of the main inflatable chamber inflates the laterally extending thoracic chamber at a second predetermined rate of pressure increase.

Still another aspect of the present disclosure is a side airbag where the predetermined rate of pressure increase in the laterally extending thoracic chamber can be selectively adjusted to modify the pressure in the laterally extending thoracic chamber.

Yet another aspect of the present disclosure is a method of providing occupant protection to a vehicle occupant situated within a passenger compartment of a motor vehicle during a vehicle side impact event. The vehicle occupant has an upper and lower thoracic region and a side arm. The method comprises the steps of providing a side airbag directed laterally into the passenger compartment, the side airbag having an inflator, a main inflatable chamber disposed for contact with the side arm of the vehicle occupant when inflated, and a separate laterally extending thoracic chamber in fluid communication with the main inflatable chamber via an internal vent of the side airbag extending laterally into the passenger compartment and disposed for contact with the lower thoracic region of the vehicle occupant below the occupant's side arm when inflated, and inflating the side airbag to simultaneously engage the occupant's lower thoracic region and side arm.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
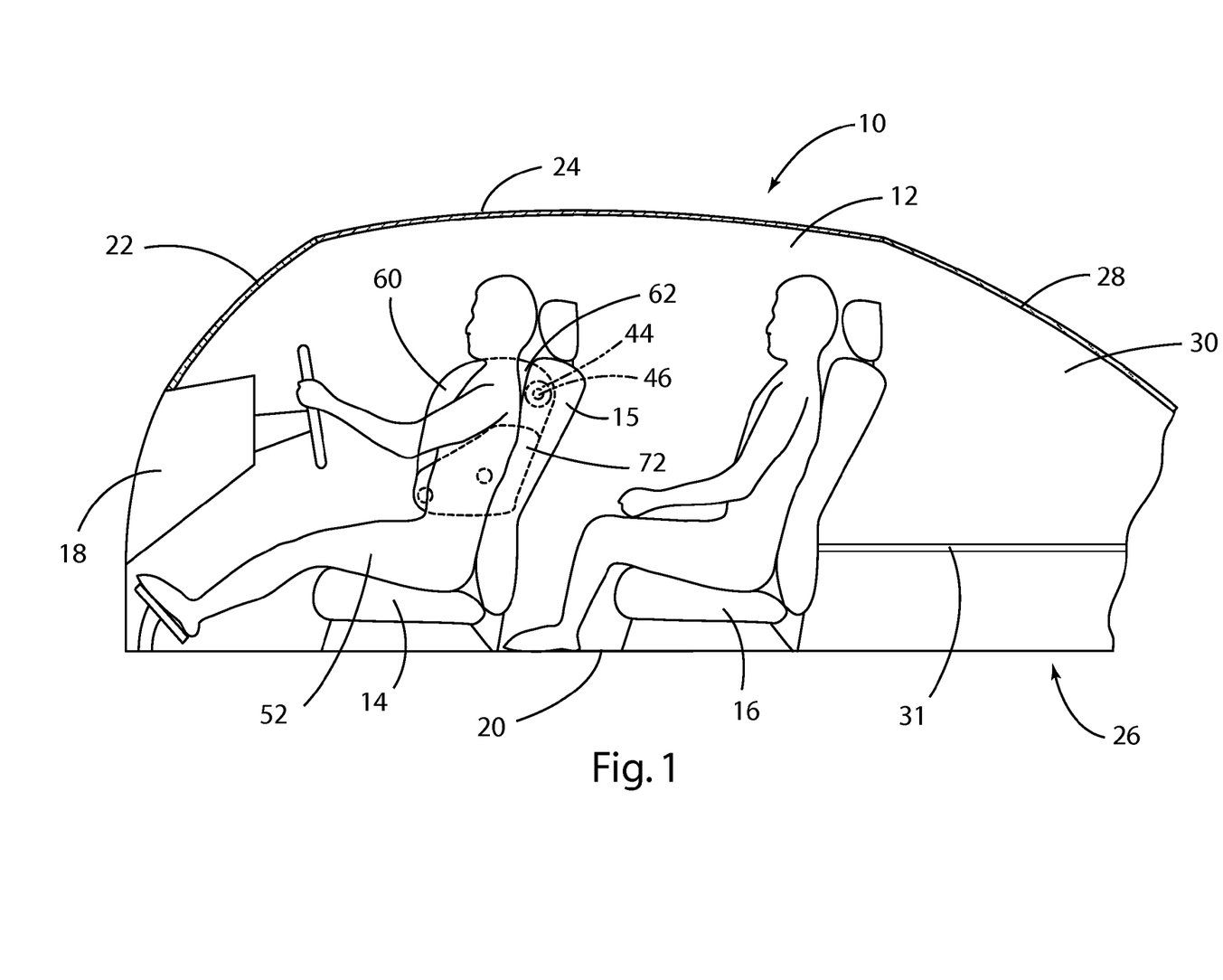
FIG. 1 is a side view of the interior of a motor vehicle incorporating the vehicle side impact airbag with a laterally extending thoracic chamber in accordance with the present disclosure in the inflated condition.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1, a motor vehicle 10 includes an interior occupant compartment 12 including a front seat assembly 14 having a seat back 15, a rear seat assembly 16, and a dashboard 18, the occupant compartment 12 defined substantially by a floor 20, windshield 22, and a roof portion 24. As is conventional, the rear end 26 of the motor vehicle 10 comprises a rear backlight 28, such as that installed in a hatchback that may be selectively opened to allow access to a cargo area 30 situated above a cargo floor 32. Of course, the motor vehicle 10 can employ a traditional trunk and truck lid assembly behind a rear window to enclose the cargo area 30.

Figure 2:
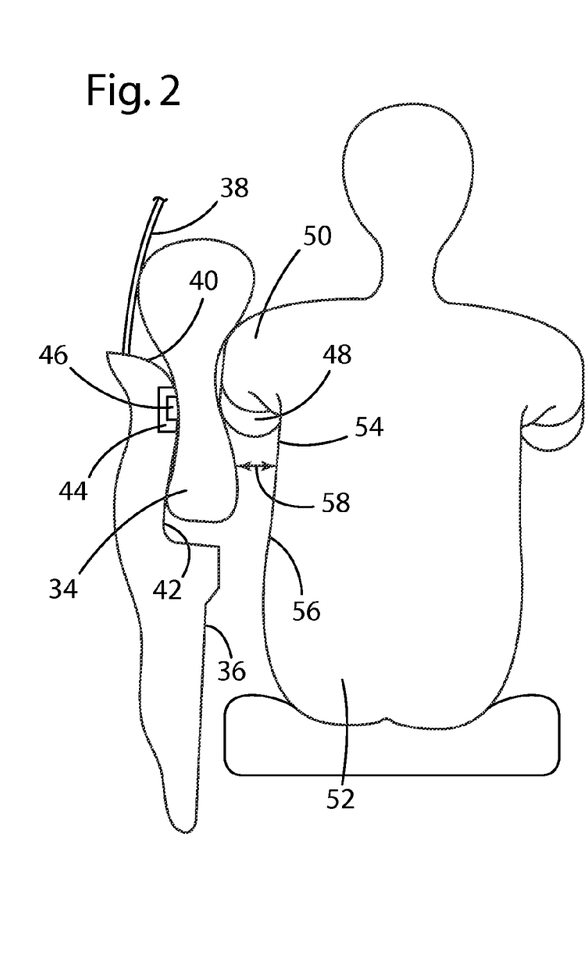
FIG. 2 is a rear view of an occupant seated in a vehicle equipped with a side airbag without a laterally extending thoracic chamber in accordance with the present disclosure in the inflated condition.

A standard side airbag 34, without the improvement disclosed herein, is shown in FIG. 2. As shown, the side airbag 34 may be mounted on the interior door surface 36 on both sides of the motor vehicle 10, typically beneath the window 38 and below the interior trim 40 of the door panel 42. However, the side airbag 34 is most commonly and preferably mounted to an outer side of the front seat back 15. The side airbag may also be mounted to the B-pillar 39, if so equipped. Preferably, a sensor (not shown) is used to send a signal to an electronic control unit to actuate an inflator 44 and initiate inflation of the side airbag 34 through duct 46 upon impact with a side external body, preferably within 5 to 10 milliseconds after the impact event begins. The typical inflation profile for a standard side airbag 34 is an initial pressurization of less than 10 KPa about 10 milliseconds after inflation initiation, with an abrupt rise in pressure to about 60 KPa about 30 milliseconds after inflation initiation and a pressure in the side airbag 34 of about 75 KPa about 50 seconds after inflation initiation.

As can be seen in FIG. 2, without the improvement disclosed herein, the side airbag 34 primarily engages only the upper arm 48, particularly the shoulder 50, of the motor vehicle occupant 52 at the initial stages of inflation and potentially during the impact event, leaving the motor vehicle occupant's thorax 54, primarily the lower thorax 56, unloaded. Thus, the air space 58 between occupant's lower thorax 56 and the interior trim 40 of the door panel 42 is not utilized for impact energy absorption. As a result, the stiffness of the standard side airbag 34 to obtain optimization for mitigation of side impacts is often dictated by the interaction of the airbag 34 solely with the occupant's upper arm 48.

The side airbag 60 incorporating the improvement disclosed herein is shown in FIGS. 1 and 3-8. As noted above, the side airbag 60 may be mounted beneath the window 38 and below the interior trim 40 of the door panel 42 (shown in FIG. 3), on the front seat back 15 (shown in FIG. 1), or on the vehicle B-pillar 39. A sensor and an electronic control unit are likewise used to actuate the inflator 44 and initiate inflation of the side airbag 60 through duct 46 upon detecting a side impact. The side airbag 60 has a main inflatable chamber 62 disposed for contact with the upper side arm 48 of the vehicle occupant 52 when inflated, and is constructed from an inner panel 64 and an outer panel 66, fabricated from nylon or polyester, having an outer perimeter 68, 70 that are sealingly joined about their respective perimeters 68, 70 to form a substantially airtight chamber.

Figure 3:
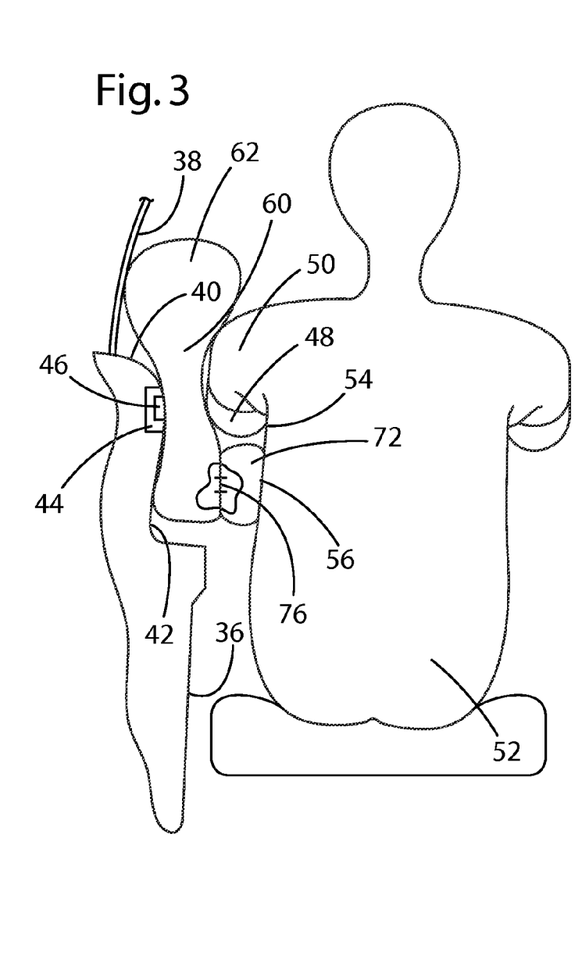
FIG. 3 is a rear view of an occupant seated in a vehicle equipped with a side airbag having a first embodiment of a laterally extending thoracic chamber in accordance with the present disclosure in the inflated condition.
Figures 4, 5:
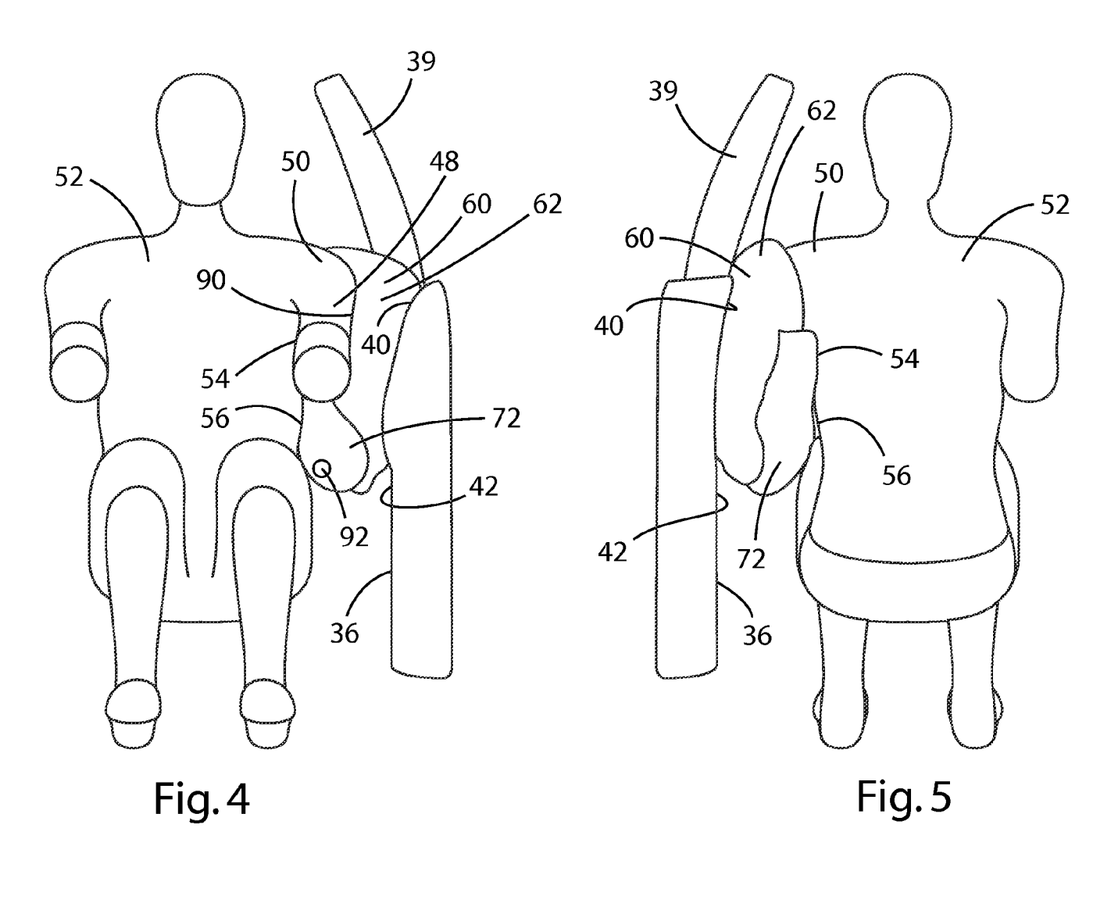
FIG. 4 is a front view of an occupant seated in a vehicle equipped with a side airbag having a second embodiment of a laterally extending thoracic chamber in accordance with the present disclosure in the inflated condition.
FIG. 5 is a rear view of an occupant seated in a vehicle equipped with a side airbag having a second embodiment of a laterally extending thoracic chamber in accordance with the present disclosure in the inflated condition.

The side airbag also has a laterally extending thoracic chamber 72 formed by sealingly attaching a third panel 74 to the inner panel 64 of the main inflation chamber 62 to form a second substantially airtight chamber, as shown in the embodiment seen in FIG. 3. The laterally extending thoracic chamber 72 is in fluid communication with the main inflatable chamber 62 of the side airbag 60 through an internal vent 76 in the inner panel 64 of the main inflatable chamber 62 that allows gas that enters the main inflatable chamber 62 to flow into the laterally extending thoracic chamber 72, as discussed further below. With the laterally extending thoracic chamber 72 thus inflated, side airbag 60 engages with the occupant's upper arm 48, in particular the shoulder 50, and lower thorax 56 simultaneously. Thus, the air space 58 between the occupant 52 and interior trim 40 is fully utilized for impact energy absorption. Accordingly, with a large area with which to contact the occupant 52, the stiffness of the laterally extending thoracic chamber 72 can be controlled through the internal vent 76 and engineered for optimal performance.

Figure 6:
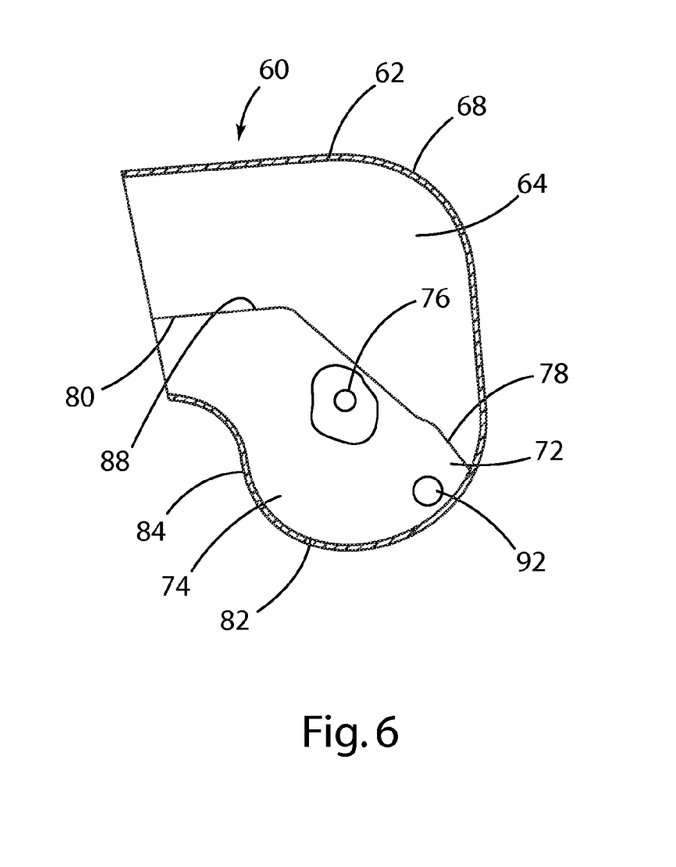
FIG. 6 is a side view of the side airbag having a second embodiment of a laterally extending thoracic chamber in accordance with the present disclosure prior to deployment in the inflated condition.
Figure 7:
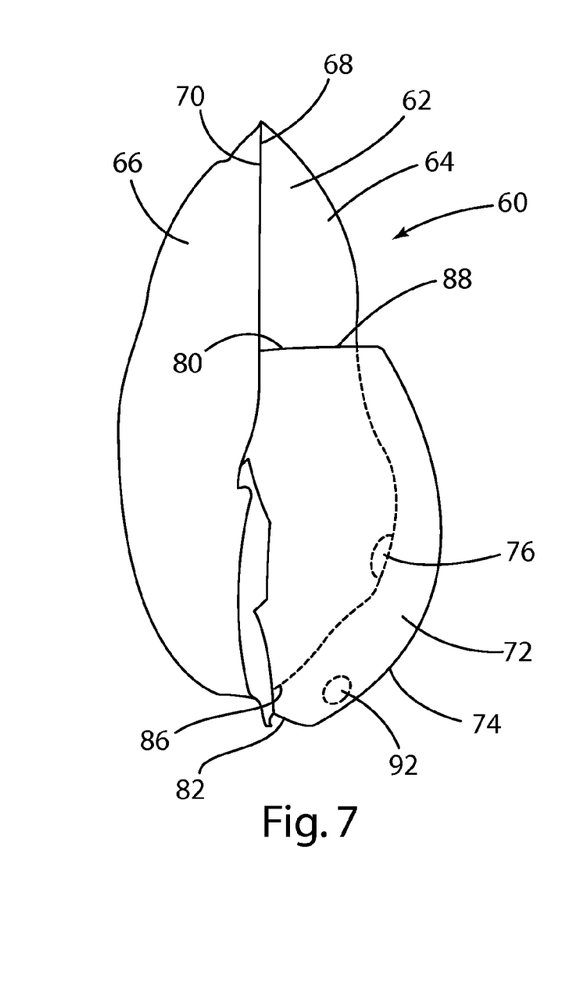
FIG. 7 is a rear side view of the side airbag having a second embodiment of a laterally extending thoracic chamber in accordance with the present disclosure in the inflated condition.
Figure 8:
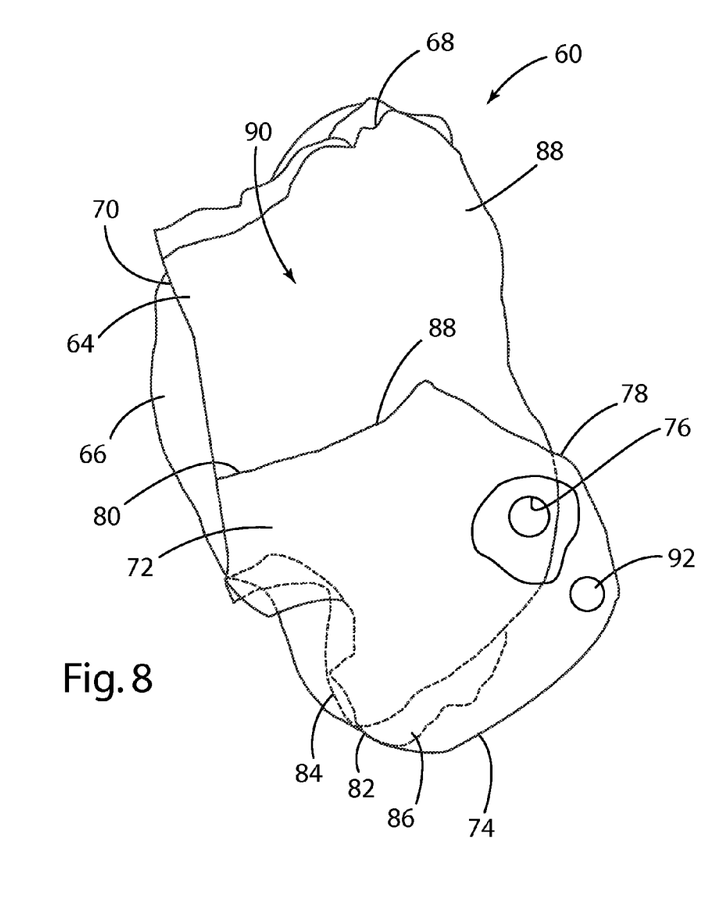
FIG. 8 is a perspective rear view of the side airbag having a second embodiment of a laterally extending thoracic chamber in accordance with the present disclosure in the inflated condition.

Preferably, the laterally extending thoracic chamber 72 has a forward edge 78 and a rearward edge 80, where the forward edge 78 is disposed lower than the rearward edge 80, as shown in the embodiment depicted in FIGS. 4-8, and as best seen in FIG. 6. Such a configuration is obtained by attaching a lower portion 82 of the outer periphery 84 of the laterally extending thoracic chamber 72 to a lower portion 86 of the outer periphery 68 of the inner panel 64 of the main inflatable chamber 62, while an upper portion 88 of the outer periphery 84 of the laterally extending thoracic chamber 72 is attached to approximately the middle of the inner panel 64 of the main inflation chamber 62. Preferably, the upper portion 88 of outer periphery 84 of the laterally extending thoracic chamber 72 forms an inclined seam between the main inflation chamber 62 and the laterally extending thoracic chamber 72 along the inner panel 64 of the main inflation chamber 62, so that the forward edge 78 is disposed lower than the rearward edge 80. This configuration effectively creates a cavity 90 within which the occupant's upper arm 48 may be received, while at the same time the laterally extending thoracic chamber 72 extends below the occupant's upper arm 48 to contact the lower thoracic region 56 of the occupant 52. Thus, once inflated, the laterally extending thoracic chamber 72 extends laterally into the passenger compartment 12 and is particularly disposed for contact with the lower thoracic region 56 of the vehicle occupant 52 below the occupant's upper side arm 48 when inflated, whereby the side airbag 60 simultaneously engages the occupant's lower thoracic region 56 and upper side arm 48 when inflated.

Preferably, the inflator 44 inflates the main inflatable chamber 62 at a first predetermined rate of pressure increase and the internal vent 76 in the inner panel 64 of the main inflatable chamber 62 inflates the laterally extending thoracic chamber 72 at a second predetermined rate of pressure increase. The rate of inflation of the laterally extending thoracic chamber 72 relative the main inflatable chamber 62 can be controlled through the size, number, and disposition of the gas vent(s) 76 provided between the two chambers. That is, where a larger gas vent 76 is provided or where a plurality of gas vents 76 are provided to create a relatively large combined cross-sectional area, a higher rate of pressure increase within the laterally extending thoracic chamber 72 can be obtained. However, if a lower rate of pressure increase within the laterally extending thoracic chamber 72 is desired, smaller gas vents 76 or fewer gas vents can be used. Thus, the rate of pressure increase in the laterally extending thoracic chamber 72 relative the main inflatable chamber 62 can be adjusted.

Preferably, the first predetermined rate of pressure increase in the main inflatable chamber 62 exceeds the predetermined rate of pressure increase in the laterally extending thoracic chamber 72. That is, the cross-sectional area of the internal vent 76 is 900 mm$^2$, which provides for the main inflation chamber 62 to experience an average pressure of about 100 to 140 KPa between 10 milliseconds and 30 milliseconds after actuation of the inflator 44 in a static deployment. Similarly, the air pressure in the laterally extending thoracic chamber 72 is preferably at an average lower pressure of 70 to 100 KPa between 10 milliseconds and 30 milliseconds after actuation of the inflator 44 in a static deployment.

Even further additional control over the rate of pressure increase, as well as pressure decrease, within the laterally extending thoracic chamber 72 can be obtained by the use of an external vent 92 to control the rate of pressure increase and decrease therein during the side impact event. Thus, the inflator 44 inflates the main inflatable chamber 62 at a first predetermined rate of pressure increase, and the internal vent 76 in the inner panel 64 of the main inflatable chamber 62 and the external vent 92 in the third panel 74 of the laterally extending thoracic chamber 72 cooperate to inflate the laterally extending thoracic chamber 72 at a second predetermined rate of pressure increase.

It can be readily contemplated that the performance of the side airbag 60 to provide side impact protection under the variety of testing protocols and criteria can be adjusted to provide optimal performance by controlling the size and number of the vents 76 provided between the main inflation chamber 62 and the laterally extending thoracic chamber 72 of the side airbag 60, as well as the external vent 92 on the laterally extending thoracic chamber 72. The disclosed side airbag 60 has an integral, but separate, laterally extending thoracic chamber 72 in the location designed to simultaneously optimize compliance with FMVSS 214 and other side impact crashworthiness testing protocols that is in metered fluid communication with the remainder of the side airbag 60. The disclosed laterally extending thoracic chamber 72 thus achieves maximal occupant body side coverage during the entire impact event. By maximizing the side airbag 60 loading area on the occupant 52, the side airbag 60 is able to absorb more impact energy. Thus, it can be made "soft" to accommodate the more vulnerable load case and still stiff enough to absorb enough energy from more severe load cases. In addition, the stiffness of the laterally extending thoracic chamber 72 can be readily engineered to be different from the main inflatable chamber 62. It provides opportunities to optimize the occupant 52 performance from one market to another. The disclosed side airbag 60 has potential benefit to further reduce occupant injury, compared with the conventional side airbag 34. The disclosed side airbag 60 provides a cost-efficient design which can potentially be used as a common design for a vehicle that sells in a global market.

Thus, an apparatus and method provides occupant protection to a vehicle occupant 52 situated within a passenger compartment 12 of a motor vehicle 10 during a vehicle side impact event. A side airbag 60 directed laterally into the passenger compartment 12 is provided, where the side airbag 60 has an inflator 44, a main inflatable chamber 62 disposed for contact with the side arm of the vehicle occupant 52 when inflated, and a separate laterally extending thoracic chamber 72 in fluid communication with the main inflatable chamber 62 via an internal vent 76 of the side airbag 60 extending laterally into the passenger compartment 12 and disposed for contact with the lower thoracic region 56 of the vehicle occupant 52 below the occupant's upper side arm 48 when inflated. The side airbag 60, when inflated, simultaneously engages the occupant's lower thoracic region 56 and side arm 48.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A side airbag for a restraining a vehicle occupant situated within a passenger compartment of a motor vehicle during a vehicle side impact event, the side airbag comprising an inflator in fluid communication with a main inflatable chamber, the main inflatable chamber having a longitudinal length adjacent an interior door surface of the motor vehicle and disposed to extend into the passenger compartment a first distance when inflated, and a separate laterally extending lower thoracic chamber attached to and in constant fluid communication with a lower portion of the main inflatable chamber of the side airbag, the lower thoracic chamber extending laterally into the passenger compartment a second distance exceeding the first distance when inflated, whereby the lower thoracic chamber of the side airbag fully extends across the longitudinal length of the lower portion only of the main inflatable chamber of the side airbag when inflated.

2. The side airbag of claim 1, wherein the main inflatable chamber has an inner and outer panel and the laterally extending thoracic chamber comprises a third panel sealingly attached to the inner panel of the main inflation chamber.

3. The side airbag of claim 2, wherein fluid communication between the main inflatable chamber and the laterally extending thoracic chamber is obtained through an internal vent in the inner panel of the main inflatable chamber, the internal vent having a predetermined and constant area.

4. The side airbag of claim 3, wherein the inflator inflates the main inflatable chamber at a first predetermined rate of pressure increase and the internal vent in the inner panel of the main inflatable chamber substantially simultaneously inflates the laterally extending thoracic chamber at a second predetermined rate of pressure increase.

5. The side airbag of claim 4, wherein the first predetermined rate of pressure increase in the main inflatable chamber exceeds the second predetermined rate of pressure increase in the laterally extending thoracic chamber.

6. The side airbag of claim 2, wherein the main inflatable chamber has an outer periphery and the laterally extending thoracic chamber has an outer periphery having a first portion thereof coinciding with and attached to a lower portion of the outer periphery of the main inflatable chamber and the laterally extending thoracic chamber outer periphery has a second portion attached to the inner panel of the main inflation chamber.

7. The side airbag of claim 6, wherein the second portion of the outer periphery of the laterally extending thoracic chamber outer periphery forms an inclined seam between the main inflation chamber and the laterally extending thoracic chamber along the inner panel of the main inflation chamber.

8. The side airbag of claim 2, wherein the laterally extending thoracic chamber comprises a third panel disposed substantially over and attached about a periphery of a lower portion of the inner panel of the main inflatable chamber and the lower portion of the inner panel of the main inflatable chamber includes an internal vent in the inner panel of the main inflatable chamber to provide controlled fluid communication between the laterally extending thoracic chamber and the main inflatable chamber of the side airbag.

9. The side airbag of claim 8, wherein the third panel of the laterally extending thoracic chamber has an external vent to control the rate of pressure increase and decrease therein during the side impact event.

10. The side airbag of claim 9, wherein the inflator inflates the main inflatable chamber at a first predetermined rate of pressure increase and the internal vent in the inner panel of the main inflatable chamber and the external vent in the third panel of the laterally extending thoracic chamber cooperate to inflate the laterally extending thoracic chamber at a second predetermined rate of pressure increase.

11. The side airbag of claim 10, wherein the first predetermined rate of pressure increase in the main inflatable chamber exceeds the second predetermined rate of pressure increase in the laterally extending thoracic chamber.

12. The side airbag of claim 1, wherein the laterally extending thoracic chamber has a forward edge and a rearward edge along the longitudinal length of the lower portion of the side airbag, wherein the forward edge is disposed lower than the rearward edge.

13. A side airbag comprising an inflator, a main inflatable chamber having a longitudinal length when inflated, and a laterally extending thoracic chamber in constant fluid communication with and attached to an interior lower portion of the main inflatable chamber extending laterally into a vehicle passenger compartment when inflated, whereby the thoracic chamber extends fully across the longitudinal length of only the interior lower portion of the main inflatable chamber when inflated.

14. The side airbag of claim 13, wherein the laterally extending thoracic chamber comprises an upper region and a lower region and the upper region of the laterally extending thoracic chamber forms an inclined interface with the main inflatable chamber when inflated.

15. The side airbag of claim 13, wherein the main inflatable chamber comprises an inner and outer panel and the laterally extending thoracic chamber comprises a third panel attached to the inner panel of the main inflation chamber and fluid communication between the main inflatable chamber and the laterally extending thoracic chamber is inflated through an internal vent of a fixed and predetermined area in the inner panel of the main inflatable chamber, whereby the inflator inflates the main inflatable chamber at a first predetermined rate of pressure increase and the internal vent in the inner panel of the main inflatable chamber substantially simultaneously inflates the laterally extending thoracic chamber at a second predetermined rate of pressure increase.

16. The side airbag of claim 15, wherein the predetermined rate of pressure increase in the laterally extending thoracic chamber can be selectively adjusted to modify the pressure in the laterally extending thoracic chamber.

17. The side airbag of claim 13, wherein the laterally extending thoracic chamber occupies an air space proximate a lower portion of the interior door surface and extends laterally into the motor vehicle a distance greater than the main inflatable chamber when inflated.

18. A method of providing occupant protection to a vehicle occupant situated within a passenger compartment of a motor vehicle during a vehicle side impact event, wherein the vehicle occupant has an upper and lower thoracic region and a side arm, the method comprising the steps of:
providing a side airbag directed laterally into the passenger compartment, the side airbag having an inflator, a main inflatable chamber having a longitudinal length disposed to extend into the passenger compartment a first distance when inflated, and a separate laterally extending thoracic chamber in constant fluid communication with the main inflatable chamber via an internal vent of the side airbag extending laterally into the passenger compartment and disposed to extend into the passenger compartment a second distance exceeding the first distance along a lower portion only of the full longitudinal length of the main inflation chamber when inflated, and
inflating the side airbag to simultaneously inflate the main inflatable chamber and the thoracic chamber.

19. The method of claim 18, further including the steps of inflating the main inflatable chamber at a first predetermined rate of pressure increase and inflating the laterally extending thoracic chamber at a second predetermined rate of pressure increase.

20. The method of claim 19, wherein the first predetermined rate of pressure increase in the main inflatable chamber exceeds the second predetermined rate of pressure increase in the laterally extending thoracic chamber.

* * * * *